United States Patent [19]

Rajchman et al.

[11] 3,742,464

[45] June 26, 1973

[54] ELECTRICALLY AND OPTICALLY ACCESSIBLE MEMORY

[75] Inventors: Jan A. Rajchman, Princeton; Walter Frank Kosonocky, Skillman, both of N.J.

[73] Assignee: RCA Corporation, New York, N.Y.

[22] Filed: Nov. 5, 1971

[21] Appl. No.: 196,031

Related U.S. Application Data

[62] Division of Ser. No. 866,564, Oct. 15, 1969, Pat. No. 3,656,121.

[52] U.S. Cl. ........................ 340/173 LS, 340/173 FF
[51] Int. Cl. ............................ G11c 7/00, G11c 5/02
[58] Field of Search ............... 340/173 LM, 173 LT, 340/173 LS, 173 FF; 317/234 T, 235; 307/238

[56] References Cited

UNITED STATES PATENTS

| | | | |
|---|---|---|---|
| 3,465,352 | 9/1959 | Carlson et al. | 340/174 LM |
| 3,518,634 | 6/1970 | Ballman et al. | 340/174 LM |
| 3,484,662 | 12/1969 | Hagon | 317/235 |
| 3,454,847 | 7/1969 | Zuleeg et al. | 317/234 T |

*Primary Examiner*—Stanley M. Urynowicz, Jr.
*Attorney*—H. Christoffersen et al.

[57] ABSTRACT

A computer memory system is disclosed which includes a randomly and electrically accessible semiconductor "page"memory. The semiconductor page memory is conventional to the extent that it includes a planar array of electrically-accessible flip-flops for storing a corresponding number of binary information bits. In addition, each flip-flop is provided with a photosensor by which the flip-flop can be set in response to received light, and is provided with a light valve controlled by the state of the flip-flop. A laser light source, a light deflector and holographic optics are provided to create a hologram of the array of light valves at any one of many small areas on an erasable holographic storage medium. Subsequently, the hologram can be illuminated to recreate and project the image of the array of light valves onto the array of photosensors to return the information to the flip-flops in the semiconductor page memory. In this way, the semiconductor page memory serves as a page-at-a-time electrical input-output unit for a great many pages of information stored optically on the erasable holographic storage medium.

4 Claims, 7 Drawing Figures

ELECTRICALLY AND OPTICALLY ACCESSIBLE MEMORY

This is a division of application Ser. No. 866,564, filed Oct. 15, 1969, now U.S. Pat. No. 3,656,121.

BACKGROUND OF THE INVENTION

Computer systems customarily include a high-speed, electrical, random-access memory for information operated on by the central processor. In addition, computer systems include mass storage memories such as magnetic drums and magnetic tape stations. In the operation of the computer system, information is frequently transferred between the high-speed random-access memory and the much slower mass storage devices. Delays and operating inefficiences frequently occur when the computer processor, in the execution of its stored program, requires access to information stored on a magnetic tape or drum. An ideal computer system would include a very large and very fast random-access main memory to accommodate all stored information. This solution to the problem is economically and technically impractical. Therefore, the direction in which improvements can be made are in providing memory systems permitting faster access to information stored in mass storage memories.

The fastest of the small memories intimately connected with a processor is probably a semiconductor memory constructed as an integrated circuit array of storage flip-flops, and including means for accessing any desired word storage locations in the array for the writing of information thereto and the reading out of information therefrom.

The storage of a massive quantity of binary information in a relatively small space is possible using an optical storage medium. Photographic film is suitable for the permanent storage of information, and other optical storage mediums are available for the erasable storage of information. A large quantity of binary information is most reliably stored in a very small area of an optical storage medium if the information is stored as a hologram so that dust and small imperfections in the system do not result in the loss of information bits.

SUMMARY OF THE INVENTION

It is an object of this invention to provide an improved memory system including a semiconductor "page" memory for very rapid access by a computer processor, a light-sensitive or optical storage medium capable of storing a very large number of "pages" of binary information, and means to effect very rapid transfers of pages of information between the semiconductor page memory and the optical storage medium. The semiconductor page memory is constructed to include memory elements (such as flip-flops) for the storage of respective binary information bits, and each memory element is provided with a light valve controlled by the electrical state of the memory element so that the information in the semiconductor memory can be rapidly transferred optically to any one of many small areas on the optical storage medium. Each memory element also includes a photosensor connected so that when any page record is illuminated, the image of light valves represented thereby is projected onto the array of photosensors to transfer the page of information from the optical storage medium to the semiconductor page memory for use by the computer processor.

DESCRIPTION OF THE PREFERRED EMBODIMENTS

Figures 1, 3:
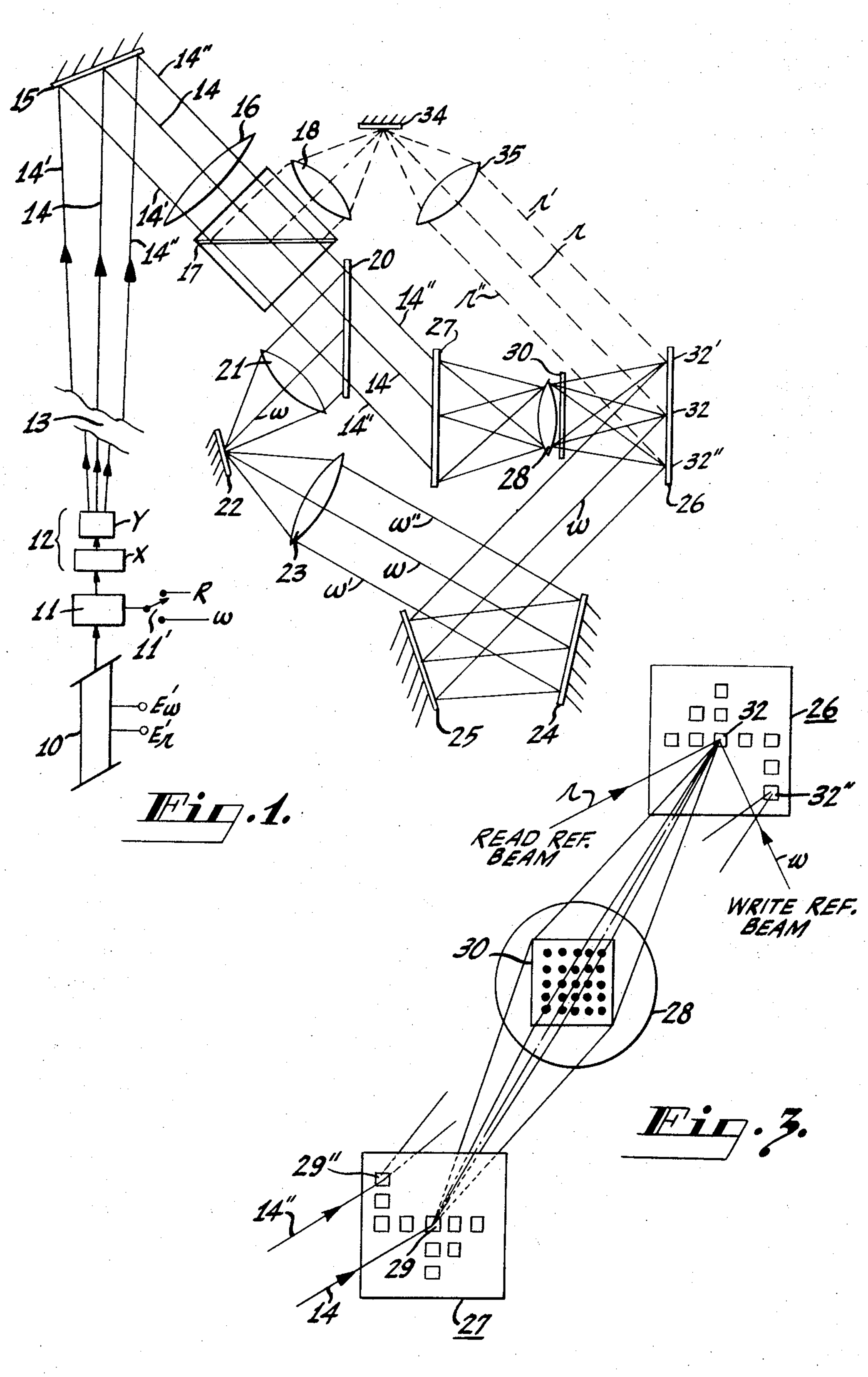
FIG. 1 is a diagram of an electronic-optical memory system constructed according to the teachings of the invention.
FIG. 3 is a perspective view of the components shown in FIG. 2.

Referring now in greater detail to FIG. 1, the memory system shown includes a laser 10, a polarization rotator 11 and a beam deflector 12 including a x-direction deflector X and y-direction deflector Y. The laser 10 may be a conventional pulsed solid state laser operating in a single transverse mode to produce a polarized and well-collimated beam. The polarization rotator is a conventional device acting in response to electrical input signals at terminals R and W to rotate the polarization of the received laser beam to one or the other of two different polarizations which are 90° apart. The polarization rotator 11 may be an electro-optic material such as potassium dihydrogen phosphate crystal having two electrodes. The polarization of an incident beam is rotated 90° when a suitable voltage is applied to the electrodes.

The X-Y beam deflector 12 may be a known digital light deflector operating in response to electrically-induced acoustic waves in a transparent liquid or solid medium. Alternatively, the deflector 12 may be a known digital light deflector including stages of polarization rotators each followed by a doubly-refracting birefringent crystal such as calcite. In this case, it is preferable to reverse the positions of the rotator 11 and deflector 12 in the path of the beam from laser 10. Since some known light deflectors produce relatively small angles of deflection, a long light path for the deflected waves may be necessary between the deflector and the point in the system where the deflected beam is utilized. In the drawing, a portion 13 of the long deflected beam path is omitted for convenience of illustration. The long path may be compacted by employing a number of light path-folding mirrors (not shown) in addition to the path-folding mirror 15.

The deflected light beam from the laser 10 may be along any one of the paths 14, 14' and 14'', or any intermediate path. The deflected beam, after being reflected by a path-folding mirror 15, is directed through a collimating lens 16 from which the angularly-deflected beams emerge in parallel relation to the optical path 14 of an undeflected beam.

A light beam emerging from the collimating lens 16 is directed to a polarizing prism 17 which reflects light beams having a "read" polarization *r* to an inverting lens 18, and which transmits light beams having a "write" polarization *w* to a beam splitter 20. The path from the polarizing prism 17 is determined by the R or W electrical energization of the polarization rotator 11.

The "read" beam reflected by the polarizing prism 17 follows a path through inverting lens 18, mirror 34 and inverting lens 35 to a small area on a holographic recording medium 26.

The polarization prism 17 is a known component which may be constructed of two triangular birefringent crystals of the same material arranged together with different orientations of their optical axes. Or, the polarization prism 17 may be constructed of a birefringent crystal slab immersed in a liquid having an appropriate refractive index. The beam splitter 20 is a known component which may be a partially-silvered mirror.

The erasable holographic storage medium 26 may be constructed of a two-millionths of an inch thick layer of manganese bismuth deposited on an oriented substrate such as mica or sapphire. The assembly is initially heated to form the manganese bismuth film into a single crystal and is later subjected to a strong magnetic field that forces all its magnetic atoms to line up with their north poles in one direction normal to the surface of the film. The direction of magnetization at elemental areas on the film can be changed where optical energy from a laser impinges and generates heat. This is called Curie point writing or recording. If the optical pattern thus recorded in the magnetic condition of the film is a phase hologram, a "read" reference beam directed to the film is reflected with a polarization rotation due to the magneto-Kerr effect which causes a re-creation of the optical image at a utilization plane. Alternatively, read-out can be accomplished by Faraday-effect magneto-optic rotation of a reference beam transmitted through the manganese bismuth film. The "read" reference beam is made to be of intensity less than the "write" beam so that the recorded hologram is not destroyed. Alternatively, the "read" reference beam can be made to have a sufficiently high intensity to provide destructive readout. That is, the hologram is erased in the process of reading out the optically stored information.

The beam splitter 20 reflects a portion such as one-half of the received light beam, and transmits the remainder of the received light beam. The reflected portion of the received light beam follows a path going through an inverting lens 21, a reflector 22, a second inverting lens 23, two mirrors 24 and 25 and thence to a small area on the erasable holographic storage medium 26. The described path is a path for a reference beam *w* used for creating a hologram on the storage medium 26. The lenses and mirrors are included in the path of the reference beam for the purpose of directing the reference at an appropriate angle, such as 30° or 45°, to the surface of the holographic storage medium 26.

Some of the components in the described reference beam path are included for the purpose of compensating for the image reversal caused by a plane mirror. Optical path arrangements other than the one illustrated in FIG. 1 may be used. It should be remembered that at any given time the light beam follows a single one of the three illustrated paths, or a single intermediate path. In addition, since the beam is deflected in both the *x* and *y* directions, the beam may follow a path which is below the plane of the paper, or above th plane of the paper, on which FIG. 1 is drawn.

The portion of the light beam which is transmitted directly through the beam splitter 20 is directed to an array of illumination holograms 27, each of which is constructed to diverge or spread out a received narrow beam to illuminate a page array 30 of binary memory units. A page lens 28 is inserted near the page array 30 to converge or concentrate the spread-out light to a small area on the holographic storage medium 26. For example, as shown enlarged in FIG. 2, the central undeflected beam 14 impinging on an illumination hologram 29 in the array 27 of illumination holograms is spread out within a conical or pyramidal solid volume to the page lens 28 and page array 30 of memory units, from which the light is concentrated through a solid conical or pyramidal volume so that the light reaches a small area 32 on the holographic storage medium 26. Similarly, when the deflected light beam 14' impinges on a hologram in the array 27, the beam is spread out within a conical or pyramidal volume to the page lens 28 and page array 30, from which the light is converged to a small area 32' on the holographic storage medium 26. In like fashion, the light beam 14'' illuminates the page array 30 and converges on the small area 32'' on the storage medium 26. The distance between the illumination hologram 27 and the holographic storage medium 26 is preferably four times the focal length of the centrally located lens 28 for one-to-one imaging.

Reference is now made to FIG. 3 of the drawing which is a perspective view of the illumination hologram 27, the page lens 28, the page array 30 of binary memory units, and the holographic storage medium 26. The array 27 of illumination holograms consists of a number of individual phase holograms, one of which at a time is illuminated by an incident light beam. When the incident light beam is undeflected and follows the path 14, the hologram 29 is illuminted, and the light emerging from the hologram 29 illuminates the entire area of the page array 30 of binary memory units. Actually, the illumination hologram 29 is constructed using the array of light valves in the page array 30 of memory units as an object so that, in use, the illumination hologram 29 illuminates solely the light valves in all of the discrete memory units (represented by black dots in FIG. 3) in the page array 30, and does not waste light on spaces between the light valves. When the beam directed to the array of holograms 27 is deflected so that it illuminates a different individual hologram 29'', the page array 30 of individual memory units is similarly illuminated.

Figure 2:
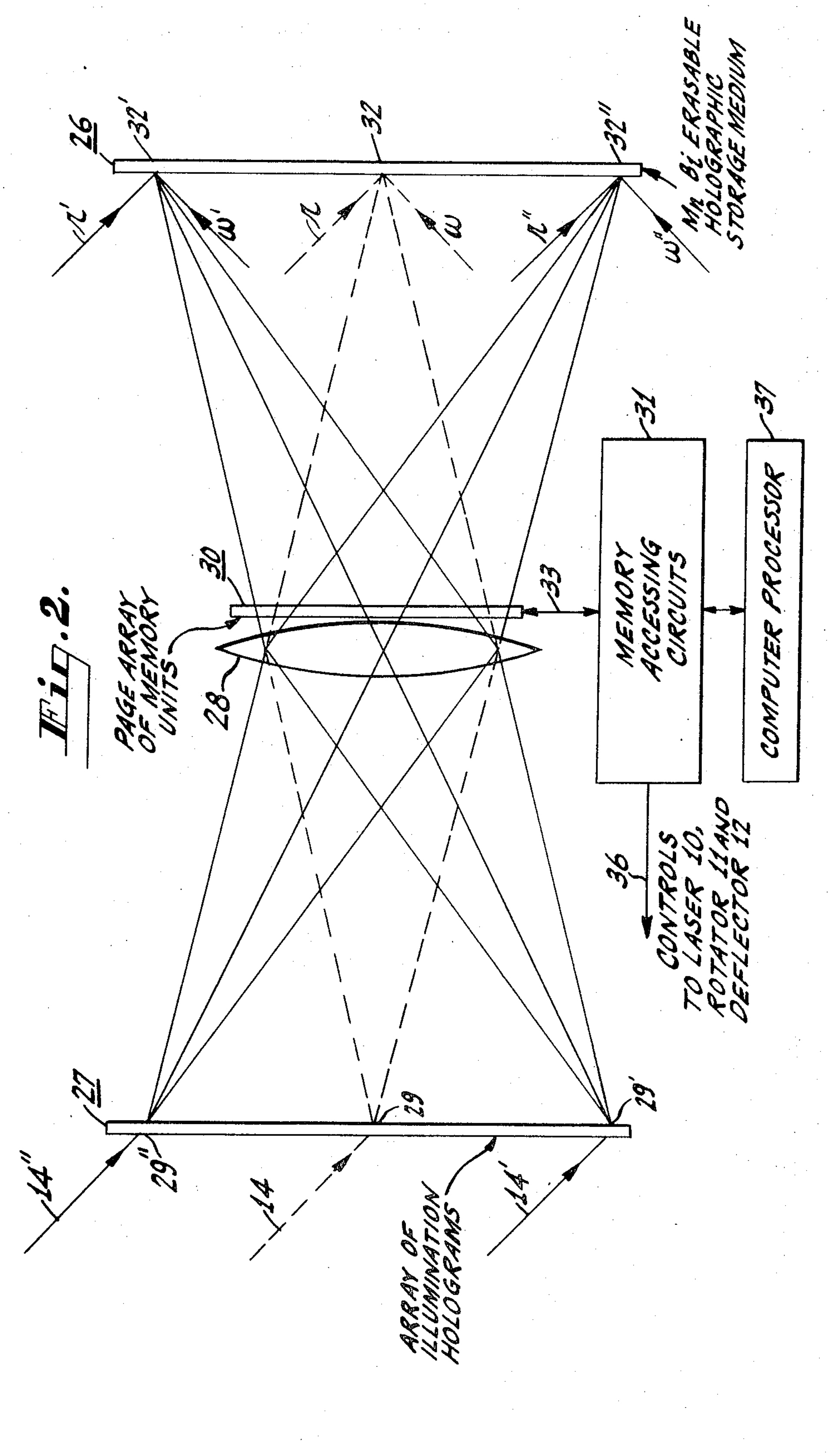
FIG. 2 is a diagram of the portion of the system of FIG. 1 including a page array of binary memory units and a holographic storage medium.

The page array 30 of memory units is an integrated array of electrical and optically accessible memory units. Each memory unit (represented by a dot in the square 30 of FIG. 3) may include a bistable transistor flip-flop, a photosensor operating in response to light to set the corresponding flip-flop, and a light valve controlled by the state of the flip-flop to pass or block light in accordance with the state of the flip-flop. The construction of the page array 30 of memory units will be described in greater detail in connection with FIGS. 4, 5 and 6. As shown in FIG. 2, memory accessing circuits 31 are connected over lines 33 to the page array 30, and over lines 36 to the optical elements 10, 11 and 12. The memory accessing circuits are controlled by a computer processor 37.

Light passing through light valves in the page array 30 (FIG. 3) is directed to a small area 32 on the holographic storage medium 26. That is, an optical image of the page array of light valves appears at the area 32. A hologram of the page array of light valves is created in the area 32 by the cooperative action of the "write " reference light beam *w*. To complete the general overall description of the system before describing components in greater detail, the information contained in the hologram 32 is later recovered and transferred back to the page array 30 of memory units by the action of a "read" reference beam *r*. The read reference beam *r* illuminates the hologram 32 and produces by reflection an optical image at the page array 30 of the previously recorded page array of light valves. That is, the original image of the array of light valves is recreated on, and illuminates, the array of photosensors included in the page array 30 of memory units. In this way the flip-flops in the page array 30 of memory units are simultaneous set to values representing the binary information originally stored electrically in the page array 30.

Figure 4:
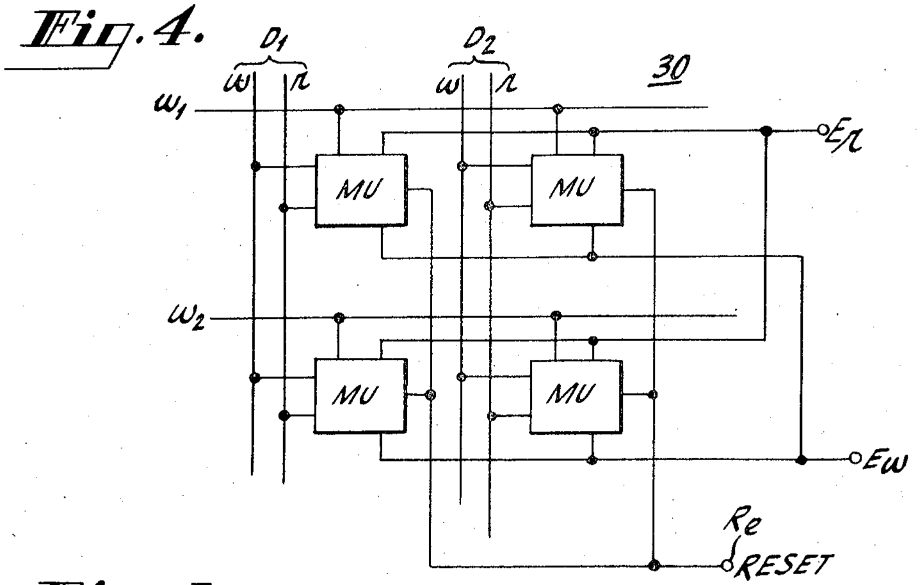
FIG. 4 is a diagram of a page array of memory units.

Reference is now made to FIG. 4 for a description of the electrical circuits on the page array 30 of binary memory units. FIG. 4 shows an array of rows and columns of memory units MU, and is illustrative of an array including a much larger number of memory units MU. A word line $W_1$ is connected to all the memory units MU in the first row of memory units, and a second word line $W_2$ is connected to all of the memory units in the second row. Digit lines $D_1$ include an electrical write line *w* and an electrical read line *r* connected to all of the memory units in a first column, and digit lines $D_2$ include conductors connected to memory units of the second column. All of the memory units MU in the array are connected to an electrical write enable terminal $E_w$. All the memory units MU in the array are also connected to an electrical read enable terminal $E_r$. Finally, all memory units are connected to a reset terminal Re.

The word-organized memory plane illustrated in FIG. 4 is one in which any row of memory units can be accessed electrically by a signal on the corresponding word line W, and information can be electrically written into and read out from the memory units along the accessed word line by means of the digit lines $D_1$ and $D_2$. All of the memory units MU can be reset to "0" by an electrical signal applied to the reset terminal R*e*.

As will become apparent from the following description, information can be optically transferred to all of the memory units MU simultaneously when the photosensors PS therein are enabled by an electrical energization supplied to the optical read enable terminal $E_r$. The information stored in all memory units MU can be simultaneously transferred optically when the light valves LV therein are enabled by an electrical energization supplied to the optical write enable terminal $E_w$.

As used herein, the words "electrical write" and "electrical read" refer to electrical writing into, and reading out from, the electrical semiconductor memory in the page array 30. These transfers are between the page array 30 and the computer processor 37. The words "write" and "read" refer to optical writing (recording) on, and read (reproducing) from, the optical storage medium 26. These transfers are between the page array 30 and the optical storage medium 26. It should be noted that "writing" on the optical storage medium is accomplished by an optical write enable signal $E_w$ which causes a read-out from the page array of memory units. Likewise, "reading " from the optical storage medium is accomplished by an optical read enable signal $E_r$ which causes a write-in to the page array of memory units.

Figure 5:
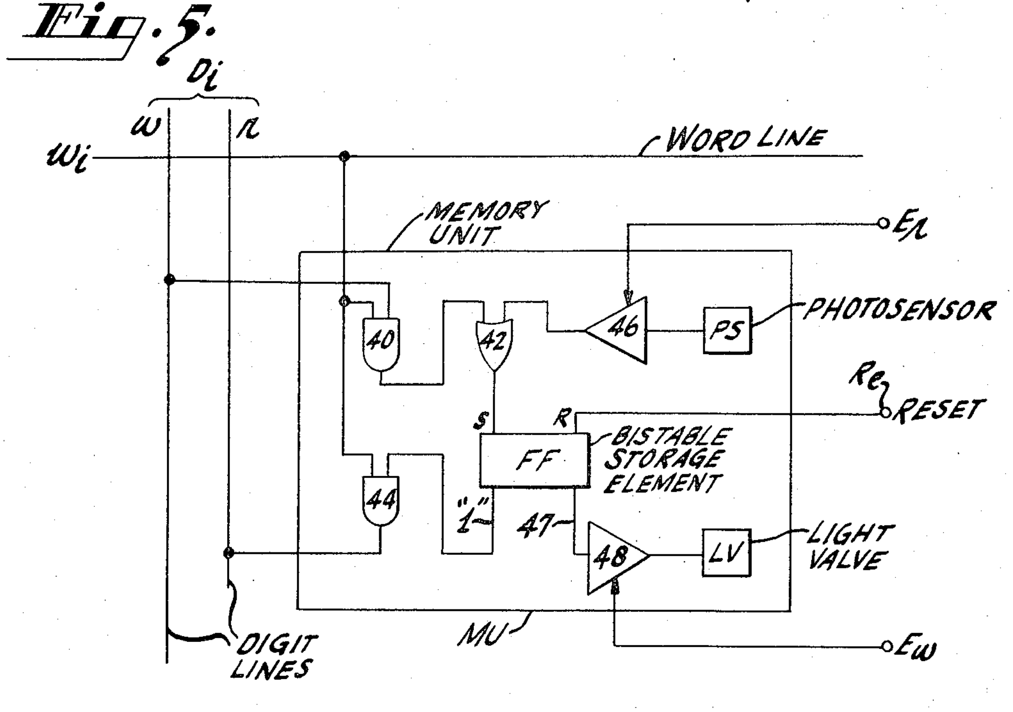
FIG. 5 is a diagram of an individual memory unit useful in the array of FIG. 4.

Reference is now made to FIG. 5 for a description of an individual memory unit suitable for use in the array of memory units shown in FIG. 4. The memory unit MU shown includes a bistable storage element such as a semiconductor flip-flop FF. The flip-flop FF may be reset to the "0" state by a reset signal applied to terminal Re. The flip-flop FF may be set to the "1" state by a word pulse applied to the word line W*i* in coincidence with a write pulse applied to the write conductor w of the digit lines $D_i$. That is, the two pulses are both applied to an "and" gate 40, which is thus enabled to supply an output through an "or" gate 42 to the set input S of flip-flop FF. The flip-flop FF is thus electrically set to the "1" state for the storage of a "1" information bit.

The information stored in flip-flop FF can be read out electrically by the application of a pulse to the word line $W_i$. If the flip-flop FF is set to the "1" state, the "1" output of the flip-flop is passed by an "and" gate 44 when the gate is enabled by a word pulse on word line $W_i$. The "1" output from gate 44 is supplied to the read conductor *r* of the digit line $D_i$.

As thus far described, the flip-flops FF in the memory units MU, together with word and digit conductors shown in FIGS. 4 and 5 constitute a conventional, random-access, semiconductor memory. However, in addition to being electrically accessible, the flip-flops FF are also optically accessible.

Each memory unit MU includes a photosensor PS having an electrical output connected through a gated amplifier 46 and the "or" gate 42 to the set input S of flip-flop FF. The electrical output of the photosensor PS is amplified by the amplifier 46 when amplifier 46 is gated "on" by an optical read enable signal from terminal $E_r$. If the photosensor PS receives light at the time when the amplifier 46 is gated on, the signal from the amplifier passes through the "or" gate 42 and causes the flip-flop FF to be set to the "1" state.

Each photosensor PS may be a PN photodiode, or a PIN photodiode including a P+ region, an intrinsic region I, and an N+ region. Incident light generates electrons and holes in the intrinsic region, which result in a current flow that is amplified and employed to set the flip-flop FF. Other types of photosensors may be selected for use. The photosensor used should be compatible with the type of electronic circuitry employed in the construction of the flip-flops and gates.

The compliment output 47 of flip-flop FF is connected to an amplifier 48 which is gated "on" when an optical write enable signal is applied to the terminal $E_w$. If the flip-flop FF provides a "1" output when amplifier 48 is gated "on," the compliment output 47 of the flip-flop is a "0," and no signal is applied through the amplifier to a light valve LV. The light valve LV therefore remains in an "open" state which permits incident light to pass through the valve.

The light valve LV may be any suitable electrically-operated device which is normally transparent to incident light, and which substantially blocks the passage of incident light when the valve is electrically energized. The light valve LV may consist of an electromagnetically operated mechanical shutter. On the other hand, the light valve LV may be a liquid crystal device having two electrical terminals and having a normally transparent liquid material between the electrodes which disperses an incident light beam when the terminals are electrically energized.

Yet another form of light valve LV suitable for use in the memory unit MU is a device consisting of an area of natural or intrinsic silicon deposited on a sapphire substrate and having electrical terminals at opposite edges of the silicon area. The silicon and the sapphire are normally transparent to light, and the silicon becomes relatively opaque when the silicon is heated by the application of electric current to the terminals.

The memory unit MU is shown in FIG. 5 in diagrammatic form with necessary power supply leads and terminals omitted for reasons of clarity of illustration. The enable terminals $E_r$ and $E_w$ may be used to supply power supply pulses to enable amplifiers 46 and 48. The entire page array 30 of memory units MU is preferably constructed as a large scale integrated circuit array on a single substrate. The integrated circuit array is made to include the access conductors as shown in FIG. 4, and to include the electronic circuitry of all of the memory units MU. As shown in FIG. 5, the electronic components of each memory unit MU include a flip-flop, gates, a photosensor PS and a light valve LV.

The page array 30 of memory units may be constructed using silicon-on-sapphire technology. The flip-flops and gates and conductors are constructed in a known manner by forming patterns of variously doped silicon and insulating and conducting materials on the sapphire substrate. The photosensor PS and the light valve LV may also be formed on the sapphire substrate in intimate physical relation with the electronic circuits of the respective memory unit.

FIGS. *6a* and *6b* are plan and sectional views of a photosensor PS and a light valve LV formed on a sapphire substrate, which also has formed thereon the associated electronic circuits. The sapphire substrate 50 is coated on one side with an opaque light mask 51 having an opening 52 for the passage of incident light through the transparent sapphire substrate to a light valve LV. The light valve LV consists of a square film 53 of high-resistivity silicon having conductive silicon terminals 54 and 55. The light valve silicon film 53 is normally transparent to incident light passing in the direction $L_i$ through mask opening 52, and it becomes relatively opaque when an electric current passes through the silicon film 53 between the terminals 54 and 55. The silicon film 53, which may be a layer about one micron thick, is raised to the temperature of about 600°C within a fraction of a microsecond after current is applied. At this elevated temperature, the silicon film 53 is relatively opaque and provides a light contrast ratio between its transparent and opaque states of about 10.

A photosensor PS is formed on the sapphire substrate 50 in surrounding relation to the light valve LV. The photosensor consists of a PIN photodiode including a layer 56 of N+ silicon, a layer 57 of N− (or I) silicon, and a layer 58 of P+ silicon. The described layers are covered by an insulating and passivating layer 59 of silicon dioxide. The N+ layer is in electrical connection with a conductor 56′ and layer 58 is in electrical connection with conductor 58′. The corresponding photosensor elements shown below the light valve LV are electrically connected in parallel by conductors (not shown).

The photosensor PS responds to incident light received in the direction $L_h$ from an illuminated hologram on the holographic storage medium 26 in FIGS. 1, 2 and 3. When the light strikes the photosensor PS, charge carriers are generated in the silicon material between diode terminals 56′ and 58′, which results in a current flow that is amplified and used to set the flip-flop FF shown in FIG. 5.

Figure 6B:
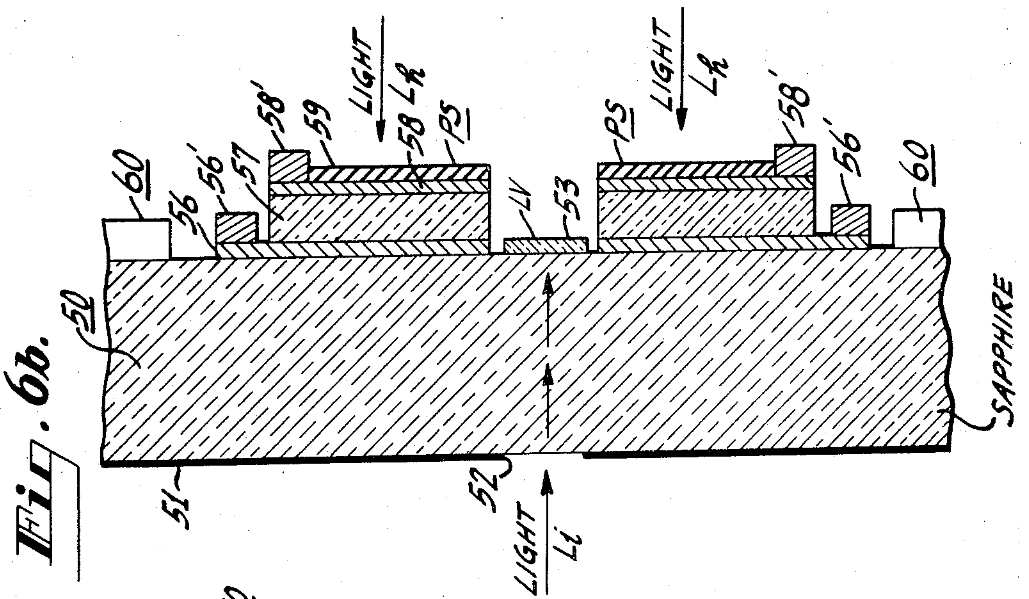
FIGS. 6*a* and 6*b* are plan and cross-sectional views of a light valve and a photosensor suitable for use in the memory unit of FIG. 5.
Figure 6A:
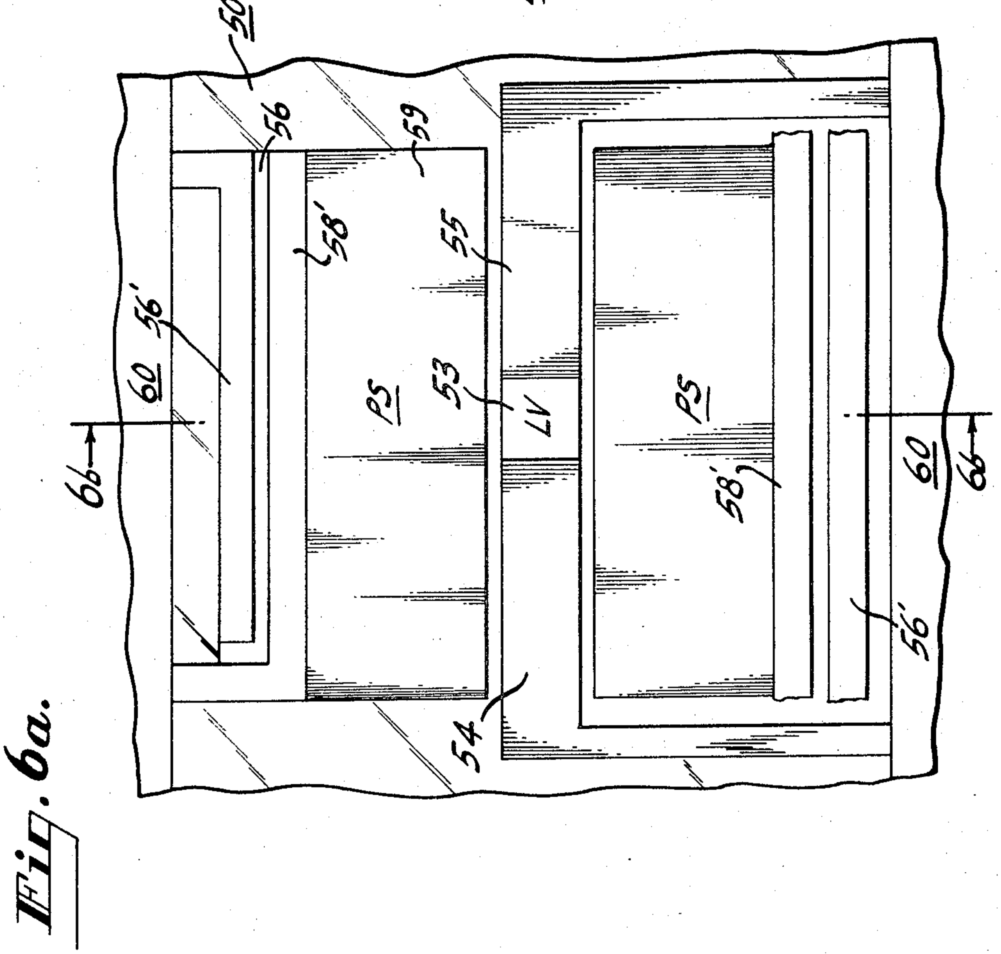

The areas on the sapphire substrate 50 which are designated 60 represent silicon-on-sapphire circuits corresponding with fragmentary portions of the flip-flop and gates shown in FIG. 5. While the light valve LV and the photosensors PS shown in FIG. 6 are arranged to be generally concentric, the two elements can be arranged in side-by-side relation, or, preferably, the two elements may be constructed in a coextensive overlapping relationship.

OPERATION OF THE MEMORY SYSTEM

The operation of the entire memory system will now be described. The page array 30 of memory units MU includes a conventional, electrically and randomly-accessable semi-conductor memory. Binary information is electrically written into all of the memory units of the page array by conventional memory accessing circuits 31. This is normally accomplished a word at a time in the usual manner under the control of a computer central processor 37. The information electrically written into the memory units is retained by the flip-flops FF in the memory units.

The information electrically stored in the flip-flops of the page array 30 is then transferred as a hologram onto one of many small areas on the holographic storage medium 26. The particular small area selected for the storage of the page of information is determined by the amount of x and y deflection given to the light beam from the laser 10. If the central area 32 of the holographic storage medium 26 is to receive the holographic image of the page array, no deflection of the laser beam by the deflector 12 is needed.

When the information in the page array 30 is to be recorded on, or written onto, the holographic storage medium 26, the laser beam is given a polarization by the polarization rotator 11 which is assigned to the "write" condition as determined by the switch 11′. The laser beam, when polarized in the "write" direction, and when undeflected, follows the path 14 directly through the polarizing prism 17 to the beam splitter 20. The portion of the light beam passing directly through the beam splitter 20 impinges on an illumination hologram in the array 27 of illumination holograms and is thereby caused to fan out within a conical (or pyramidal shaped) volume which illuminates the page array 30 of memory units.

The illumination holograms in the array 27 of illumination holograms are preferably constructed so that only the light valves of the memory units are illuminated, to the exclusion of the spaces between light valves where the light would otherwise be wasted. The light valves in the array 30 of memory units are at this time conditioned to pass or block incident light depending on state of the corresponding flip-flop in the memory unit.

To conserve power, the light valves are operated in accordance with the state of the corresponding flip-flops only at the moment when the laser beam is pulsed "on" for optical writing purposes. This is accomplished by applying an optical write enable pulse to the terminal $E_w$ of all of the memory units in the page array 30 concurrently with the pulsing of the laser source 10. The pattern of light spots created by the open and closed light valves is projected onto the small area 32 on the holographic storage medium 26.

A holographic reference beam $w$ is simultaneously directed to the same small area 32 on the medium 26. The reference beam is constituted of the portion of the beam reflected by beam splitter 20 and following a path $w$ through lens 20, mirror 22, lens 23, and inverting mirrors 24 and 25 to the small area 32 on holographic storage medium 26. The interfering action of the page array object beam from page array 30 and the reference beam $w$ produces a page hologram at the small area 32 on the medium 26. The thus-recorded page hologram remains on the manganese bismuth storage medium until it is intentionally erased. Erasure of a single page hologram on the medium 26 can be accomplished by illuminating the hologram, with a light intensity lower than needed for Curie point writing, in the presence of a magnetic field having an intensity too low to erase non-illuminated page holograms.

The page array hologram which has been described as being formed at the small area 32 on the holographic medium 26 could have been recorded at any other selected position on the medium 26 by appropriately controlling the $x$ and $y$ deflection imparted to the laser beam by the deflector 12.

When it is desired to retrieve and utilize the page of information stored as a hologram in the small area 32 of the medium 26, the "read" terminal R of polarization rotator 11 is energized and the laser 10 is pulsed at the same time that an optical read enable pulse is applied to the terminal $E_r$ in the page array 30. The deflector 12 is set to not deflect the beam in either of the $x$ or $y$ direction. The beam 14, having the "read" polarization is reflected by the polarizing crystal 17 to the path $r$ through lens 18, mirror 34, and lens 35, to the small area 32 on the holographic storage medium 26. The angle at which the beam strikes the hologram 32 is exactly the conjugate of the angle of the beam $w$ used when the hologram was written.

The read beam $r$ impinging on the hologram at 32, causes light to be reflected in a conical or pyramidal shaped volume back to the photosensors on the page array 30 of memory elements. The electrical outputs of the photosensors respond to the received light pattern to set the corresponding flip-flops FF in the corresponding memory units in accordance with the image recreated from the hologram 32 on the medium 26. Thereafter, with the flip-flops FF in the page array 30 retaining the digital information, the information can be read out electrically, a word at a time, and utilized by an associated computer processor.

The herein disclosed electrically and optically accessible memory system includes a page array of memory units each including a bistable semiconductor storage element, a photosensor and a light valve. The intimate physical grouping of each storage device, photosensor and light valve in the page array eliminates optical registration problems encountered in constructions having physically separated devices. The array of photosensors used to read out a hologram recorded on the optical storage medium is in perfect registry with the array of light valves used to initially write or record the hologram. This is particularly so when each photosensor and associated light valve are constructed to be concentric or coextensive. The effectiveness and efficiency of the illumination hologram 27 can be insured by using the page array of light valves as the object, together with system optics such as lens 28, when creating the illumination hologram 27. While the described memory system employs holographic optics, the page array of memory units is also useful in systems employing conventional optics.

What is claimed is:

1. The combination of an integrated array of electrically and optically accessible memory units, each memory unit including a semiconductor bistable storage element coupled to selection and information lines for electrical access, each memory unit also including a photosensor responsive to light and having an output connected to a set input of said bistable storage element, and a light valve responsive to the output of said bistable storage element and operative to control the passage therethrough of incident light, whereby said memory units are also optically accessible.

2. The combination defined inclaim 1 wherein said bistable storage element, and said photosensor are constructed of silicon on sapphire.

3. The combination defined in claim 2 wherein said light valve is also constructed of silicon on sapphire.

4. An electrically and optically accessible memory, comprising an array of memory units, each memory unit including a semiconductor bistable storage element, said array including word lines to which electrical selection signals can be applied, and digit lines by which binary information can be electrically read into, and out from, the array of memory units, whereby the array of memory units is electrically accessible for the storage and retrieval of binary information, each of said memory units including a photosensor responsive to light and having an output electrically connected to a set input of said bistable storage element, whereby binary information can be optically read into the array of memory elements, and each of said memory units also including a light valve responsive to the electrical output of said bistable storage element and operative to control the passage therethrough of incident light, whereby binary information can be optically read out from the array of memory elements.

* * * * *